(12) United States Patent
Tiwari et al.

(10) Patent No.: US 7,716,151 B2
(45) Date of Patent: May 11, 2010

(54) APPARATUS, METHOD AND PRODUCT FOR OPTIMIZING SOFTWARE SYSTEM WORKLOAD PERFORMANCE SCENARIOS USING MULTIPLE CRITERIA DECISION MAKING

(75) Inventors: Nidhi Tiwari, Bangalore (IN); Rajeshwari Ganesan, Bangalore (IN)

(73) Assignee: Infosys Technologies, Ltd., Bangalore (IN)

( * ) Notice: Subject to any disclaimer, the term of this patent is extended or adjusted under 35 U.S.C. 154(b) by 459 days.

(21) Appl. No.: 11/704,293

(22) Filed: Feb. 9, 2007

(65) Prior Publication Data

US 2007/0192266 A1 Aug. 16, 2007

(30) Foreign Application Priority Data

Feb. 13, 2006 (IN) .......................... 229/CHE/2006

(51) Int. Cl.
*G06F 17/00* (2006.01)
*G06N 5/00* (2006.01)
(52) U.S. Cl. .............................. 706/45; 703/21; 703/22
(58) Field of Classification Search ................... 706/45, 706/18; 703/21, 22
See application file for complete search history.

(56) References Cited

U.S. PATENT DOCUMENTS

| | | | |
|---|---|---|---|
| 6,957,186 B1 * | 10/2005 | Guheen et al. ................. | 705/1 |
| 6,957,211 B1 * | 10/2005 | Tyulenev et al. ............... | 707/2 |
| 7,139,741 B1 * | 11/2006 | Benjamin ..................... | 706/45 |
| 7,149,698 B2 * | 12/2006 | Guheen et al. ................. | 705/1 |
| 2002/0194251 A1 * | 12/2002 | Richter et al. ............... | 709/105 |
| 2003/0182281 A1 * | 9/2003 | Wittkowski .................... | 707/5 |
| 2003/0208514 A1 * | 11/2003 | Yang et al. ................... | 708/160 |
| 2004/0103058 A1 * | 5/2004 | Hamilton ...................... | 705/38 |
| 2005/0010388 A1 * | 1/2005 | Bagchi et al. ................. | 703/22 |
| 2005/0071266 A1 * | 3/2005 | Eder ........................... | 705/38 |
| 2006/0026010 A1 * | 2/2006 | van Moorsel et al. .......... | 705/1 |
| 2006/0053063 A1 * | 3/2006 | Nagar .......................... | 705/26 |
| 2006/0161884 A1 * | 7/2006 | Lubrecht et al. ............. | 717/104 |
| 2006/0167784 A1 * | 7/2006 | Hoffberg ...................... | 705/37 |
| 2007/0083418 A1 * | 4/2007 | Quiring et al. ................ | 705/10 |
| 2007/0083502 A1 * | 4/2007 | Ramakrishnan ................ | 707/4 |
| 2007/0112652 A1 * | 5/2007 | Ricketts ....................... | 705/30 |
| 2007/0248102 A1 * | 10/2007 | Wang et al. ............ | 370/395.42 |
| 2008/0030768 A1 * | 2/2008 | Snyderman et al. ........ | 358/1.15 |

(Continued)

OTHER PUBLICATIONS

Menascé, D. A., Almeida, V. A., Fonseca, R., and Mendes, M. A. 2000. Business-oriented resource management policies for e-commerce servers. Perform. Eval. 42, 2-3 (Oct. 2000), 223-239.*

(Continued)

*Primary Examiner*—David R Vincent
*Assistant Examiner*—D H Kim
(74) *Attorney, Agent, or Firm*—Marc S. Kaufman; Nixon Peabody, LLP (57) ABSTRACT

The present technique is an apparatus and method evaluating software performance. The method identifies performance scenarios using a knowledge base and selects the performance scenarios from a context module using operational laws. The system analyzes performance criticality of an application workload. Furthermore, the system comprises a context module that ranks the performance criterions depending on the input and the knowledge base stores and retrieves the performance criterions using the operational laws. The knowledge base comprises the criterions and their relevant ranks based of the application context. The present technique automates classification of performance criterions into benefit and cost categories with the usage of the operational laws.

28 Claims, 3 Drawing Sheets

U.S. PATENT DOCUMENTS

| | | | |
|---|---|---|---|
| 2008/0040305 A1* | 2/2008 | Yang et al. | 706/46 |
| 2008/0168015 A1* | 7/2008 | Thie et al. | 706/46 |
| 2008/0215512 A1* | 9/2008 | Narzisi et al. | 706/13 |
| 2009/0030771 A1* | 1/2009 | Eder | 705/10 |
| 2009/0043637 A1* | 2/2009 | Eder | 705/10 |

OTHER PUBLICATIONS

Kurowski, K., Nabrzyski, J., and Pukacki, J. 2001. User Preference Driven Multiobjective Resource Management in Grid Environments. In Proceedings of the 1st international Symposium on Cluster Computing and the Grid (May 15-18, 2001). CCGRID. IEEE Computer Society, Washington, DC, 114.*

Balsamo, S.; Di Marco, A.; Inverardi, P.; Simeoni, M., "Model-based performance prediction in software development: a survey," Software Engineering, IEEE Transactions on , vol. 30, No. 5, pp. 295-310, May 2004.*

Dias, L. et al. IRIS—Interactive Robustness analysis and parameters' Inference for multicriteria Sorting problems (Version 2.0) User Manual. Instituto de Engenharia de Sistemas e Computadores Institute of Systems Engineering and Computers INESC Coimbra. Apr. 2003.*

Opricovic et al. Compromise solution by MCDM methods: A comparative analysis of VIKOR and TOPSIS. European Journal of Operational Research 156 (2004) 445-455. Jul. 2004.*

Aiber et al. Autonomic Self-Optimization According to Business Objectives. Proceedings of the International Conference on Autonomic Computing (ICAC'04). May 2004.*

Andrews, A., Mancebo, E., Runeson, P., and France, R. 2005. A Framework for Design Tradeoffs. Software Quality Control 13, 4 (Dec. 2005), 377-405.*

Omkarprasad S. Vaidya, Sushil Kumar, Analytic hierarchy process: An overview of applications, European Journal of Operational Research, vol. 169, Issue 1, Feb. 16, 2006, pp. 1-29, ISSN 0377-2217.*

Triantaphyllou, E.; Baig, K., "The impact of aggregating benefit and cost criteria in four MCDA methods," Engineering Management, IEEE Transactions on , vol. 52, No. 2, pp. 213-226, May 2005.*

* cited by examiner

APPARATUS, METHOD AND PRODUCT FOR OPTIMIZING SOFTWARE SYSTEM WORKLOAD PERFORMANCE SCENARIOS USING MULTIPLE CRITERIA DECISION MAKING

CROSS REFERENCE TO RELATED DOCUMENTS

This application claims priority under 35 U.S.C. §119 to Indian Patent Application Serial No. 229/CHE/2006 of TIWARI et al., entitled "APPARATUS FOR IDENTIFICATION OF PERFORMANCE SCENARIO AND METHODS THEREOF," filed Feb. 13, 2006, the entire disclosure of which is hereby incorporated by reference herein.

BACKGROUND OF THE INVENTION

Field of the Invention

The present technique relates generally to software performance engineering for enterprise applications and performance modeling of software systems. In particularity, the present technique relates to an automation method for selecting performance scenarios from multiple application workloads for analyzing performance of a software system.

DISCUSSION OF THE BACKGROUND

Proactive performance management needs a process for the development of a performance model. Software performance modeling and analysis is used for verification of a software system with a set of representative performance scenarios. The representative performance scenarios are the software system's critical workloads. Identification of the performance scenarios may be essential for the software system design validation and the performance test phase.

The process of arriving at the scenarios is complex, which requires knowledge of the multiple performance considerations in the development environment such as architecture type, technology and operating environment like response time, workload intensity, business importance and resource intensity. Furthermore the applicability of the performance considerations in the context of the software system may be required during the process of arrival of performance scenarios. The operational laws from performance engineering may figure-out the relationship of performance metrics in identifying the criterions.

The existing technology initially lacks a knowledge base to store and retrieve input based performance consideration consisting of multiple criterions. Secondly, the existing technology lacks the method to convert task of identification of the representative performance scenarios into a multi-criteria decision making problem. Thirdly, the existing system lacks applying operational laws from performance engineering to working out the relationships of performance metrics resulting to criterions. Fourthly, the system lacks a method to identify performance scenarios, performing the cost/benefit analysis considering the operational laws in software performance engineering.

Accordingly, there is a need for a technique that is essential for the subject matter experts for the performance scenario selection. The decision making process may be prone to subjectivity as there may be multiple qualitative and quantitative criterions resulting in an incorrect or incomplete evaluation of the software system's performance. The existing technology may not define any procedure to objectively arrive at the scenarios. The experts may use their knowledge to arrive at the representative performance scenarios.

SUMMARY OF THE INVENTION

The present technique focuses on automating the selection of performance scenarios from several application workloads based on input for performance analysis or modeling.

In one embodiment of the present technique a method of evaluating software performance may be disclosed. The method includes identifying a plurality of performance considerations using one or more operational laws. The method further includes selecting multiple performance scenarios for at least one software system based on at least one of the plurality of performance criterion.

In another embodiment of the present technique a system for analyzing performance of at least one application workload may be disclosed. The system comprises an input module, a selection module and an output module. In one aspect of the present technique, the input module may be adapted to obtain a plurality of performance criterion from at least one knowledge base depending on at least one input using one or more operational laws. Further, the selection module may be adapted to select a plurality of performance scenarios for at least one software system depending on at least one of the plurality of performance criterion using at least one of the MCDM techniques. Further, the output module may be adapted to generate the plurality of performance scenarios based on the at least one input and the plurality of performance criterion and at least one rank using at least one of at least one MCDM technique.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE PREFERRED EMBODIMENTS

The following description is full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings and the appended claims. While the system and method described herein are provided with a certain degree of specificity, the present technique may be implemented with either greater or lesser specificity, depending on the needs of the user. Further, some of the features of the present technique may be used to advantage without the corresponding use of other features described in the following paragraphs. As such, the present description should be considered as merely illustrative of the principles of the present technique and not in limitation thereof, since the present technique is defined solely by the claims.

As a preliminary matter, the definition of the term "or" for the purpose of the following discussion and the appended claims may be intended to be an inclusive "or". That may be, the term "or" may be not intended to differentiate between two mutually exclusive alternatives. Rather, the term "or" when employed as a conjunction between two elements may be defined as including one element by itself, the other element itself, and combinations and permutations of the elements. For example, a discussion or recitation employing the terminology "A" or "B" includes: "A" by itself, "B" by itself and any combination thereof, such as "AB" and "BA." It may be worth noting that the present discussion relates to exemplary embodiments, and the appended claims should not be limited to the embodiments discussed herein.

The present invention relates to a technique to solve multi-attribute problem in identifying performance scenarios. The present technique focuses on automating the selection of performance scenarios from several application workloads or scenarios for performance analysis or modeling. The present technique is an automatic identification of representative performance scenarios based on the application context, criterions and relevant ranks, capitalizing on operational laws.

Figure 1:
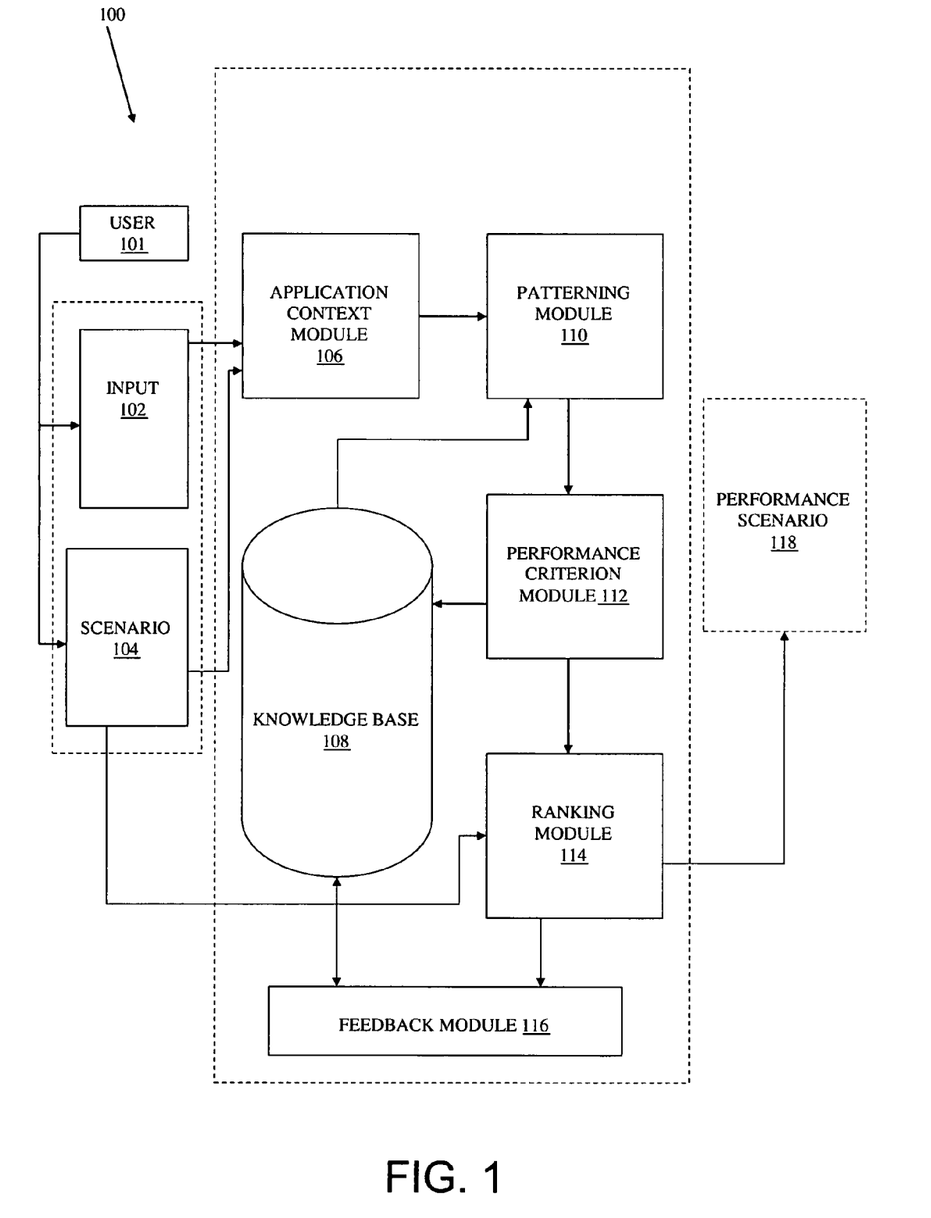
FIG. 1 is a system depicting interlinking with various modules for obtaining applicable criterions from the knowledge base based on the input and identifying representative performance scenarios, in accordance with the present technique.

Referring to FIG. 1 it illustrates a typical block diagram of a system 100 for identification of performance scenarios. The system 100 includes a user 101, an input 102, a scenario 104, an application context module 106, a knowledge base 108, a patterning module 110, a performance criterion module 112, a ranking module 114, a feedback module 116, and a performance scenario 118. The user is linked to the input 102 and the scenario 104 to present application content and application functionalities along with the performance requirements. The user 101 further sends the application context the input 102 and the application functionalities to the scenario 104. It should be noted that the application context may be thereby a technology being used as a programming platform (J2EE/DOTNET) or a domain of application (billing) or operating system (WINDOWS/UNIX/DOS). The user 101 has the facility to re-assign the ranks to the performance criterions. The scenario 104 may be a list of the application functionalities with corresponding performance requirements. It should be noticed or observed with care that the performance requirements may be throughput or response time. The input 102 and the scenario 104 both together send the application context details and the application functionalities to the application context module 106.

The application context module 106 acts as a Graphical User Interface (GUI) tool to collect the inputs from the user 101. The scenario 104 may be a business critical application scenario and may have a stringent performance objective of very low response time. Likewise, based on the scenario 104 there may be multiple application scenario details that may be considered as workload type, number of external interfaces or resource demand. Furthermore, the input 102 may be a collection of multiple application scenario details required for evaluating performance of software system from the performance requirements or stakeholders. It should be noted with high attention that the most commonly used performance criterions may be retrieved based on the application context details. The scenario 104 may be containing the functionalities of the application with performance requirements. The input 102 further may be linked to the application context module 106 for interfacing with the other modules.

The knowledge base 108 stores the lists of performance criterions and supply the historical data to the requests as demanded. The patterning module 110 takes the application context details and maps to the knowledge base 108 and gives the list of the performance criterions and relevant ranks. The operational laws may be used further for classifying the performance criterions into cost criteria and benefit criteria. A performance criterion module 112 utilizes the operational laws and accordingly, lists the performance criterions into the knowledge base 108. The performance criterions apply operational laws from performance engineering to work out the relationships of performance metrics known as performance criteria. The performance criterion module 112 lists of most commonly used performance criterions and their relevant ranks into the knowledge base 108. The patterning module 110 maps the relevant ranks based on the context application details of input 102. The user 101 may have the ability to change the ranks to the performance criterions. In this case, the user 101 may re-assign the ranks using the MCDM technique using the performance criterion module 112. The scenario 104 may be application functionalities such as login or selecting an item or adding to a cart or checking an item along with the performance requirements is from the input 102 by the user 101. The operational laws may be used to classify the identified performance criterions into cost and benefit criterions depending on the higher or lower values obtained for better performance. The performance criterion module 112 allots ranks or weights to both the cost criteria and benefit criteria using the Multi Decision Criteria Making (MCDM) technique. The MCDM technique may be ordering the list of criterions or workloads or scenarios and the operational laws may be resolving the performance criterions. The ranking module thereby may be explained with first ranking and second ranking. A feedback module 116 may be whereby the user 101 adds performance criterions or perform changes to the criterions ranks. Furthermore, the feedback module 116 updates the changes in the performance criterions with the relevant rank and sends to the knowledge base 108 for future references.

The performance criterion module 112 uses operational laws to give a list of performance criterions and stored in the knowledge base 108 for future purposes. It should be noted that the operational laws are general equations based on observable variables used to analyze the software performance. Further, the operational laws may be used to identify the factors that are relevant to the performance of any scenario 104 and may be the metrics whereby values may be obtained from the stakeholders. It should be noted that the performance criterion module 112 utilizes an equation thereby. Furthermore, utilization law may be device utilization=device throughput*service demand whereby, device throughput may be the number of requests processed per second. Further, service demand may be the time taken to process one request by the device. It may be noted that service demand for the devices remain constant. Accordingly, to support higher throughput the device utilization may also increase. Furthermore, selection of performance scenarios may be performed by classification of the throughput and the device utilization as benefit criteria as their higher values may be critical to performance of a software system. Furthermore, it should be noted with high attention the process to identify the performance criteria is performed with a Little Law equation:average queue length=system throughput*response time. It should be observed that the system throughput and response time for the scenario 104 as specified in the performance requirements of the software system 100. Likewise, as less the queue length may be desired even for higher throughputs using little law the response time may be classified as cost criteria whereby low values may be of advantage for better performance of the software system 100. Initially, the default ranks of the required criteria may be identified using the historical data in the knowledge base 108.

Figure 2:
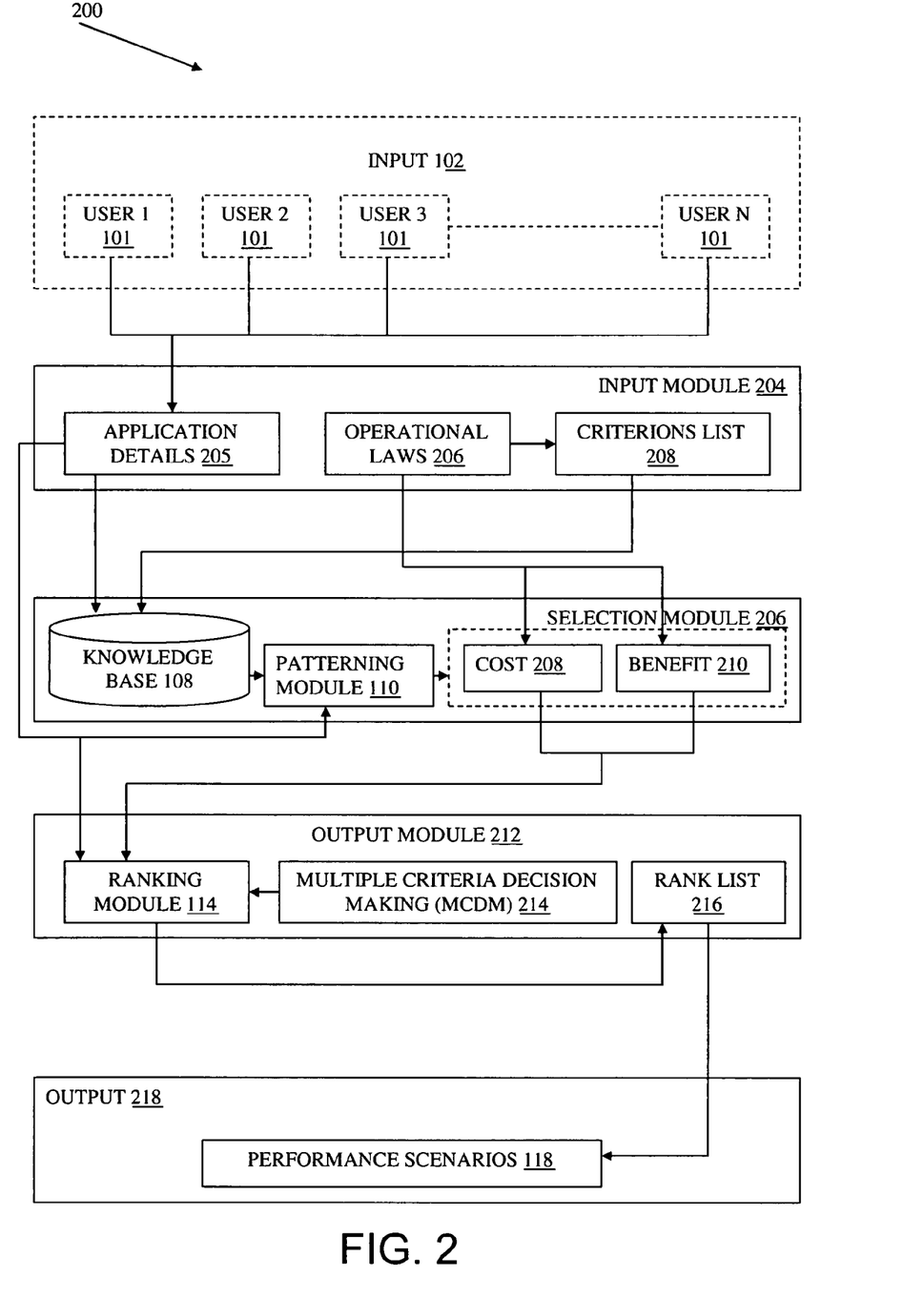
FIG. 2 is a schematic representation focusing on the various stages involved from input to output in performance scenario identification and ordering a list of scenarios, in accordance with an aspect of the present technique.

Referring now to FIG. 2, illustrates a schematic representation 200 for identifying the performance scenarios is disclosed. The representation 200 includes input 102, input module 204, selection module 206, output module 212, and output 218. The input 102 consists of multiple users 101 to submit the input 102 performance requirements to the input module 204. The input module 204 consists of sub-modules namely application details 205, operational laws 206 and criterions list 208. The application details 205 may be obtained from the user 101. It should be noted that the application details 205 is the application context details such as technology used or domain of application or operating system. The operational laws 206 may be the performance engineering rules for enumerating and categorizing the performance considerations in operating and development environment. The operational laws 206 may be linked to the criterions list 208 to figure out the relationship of performance metrics of the input 102. The operational laws 206 may be used to classify the performance criterions into cost criteria 208 and benefit criteria 210.

The selection module 206 consists of sub-modules namely knowledge base 108, patterning module 110 linked to cost 208 and benefit 210. The knowledge base 108 may be a repository consisting performance considerations and performance criterions and relevant ranks that may be applicable to multiple input 102. The knowledge base 108 may be utilized for creation, storage, representation and usage for the automation of performance scenario identification. The patterning module 110 will take the application details 205 and map it to the knowledge base 108 to give the criterions list 208. The criterions list 208 may be a list of the performance criteria and its relevant ranks. The operational laws 106 is linked to the knowledge base 108 to automate classification of performance criterions into directly proportional (benefit criteria 210) and inversely proportional (cost criteria 208) for performance scenario selection. According to this classification, the benefit criteria 210 may be criteria with higher value. As a preliminary example benefit criteria 210 may be business criticality, workload intensity, number of external interfaces and resource intensiveness. As a contrary, the cost criteria 208 may be the criteria with lower value. The output module 212 consists of sub-modules namely ranking module 114, MCDM 214, and rank list 216. The ranking module 114 computes the relative ranks of the application details 205 for each qualitative criteria and quantitative criteria. The ranking module 114 may be determining both the first ranking and the second ranking.

The first ranking is explained as follows. The application details 205 may be obtained from the user 101. For example, performance requirements specification from the user 101 may give response time targets. The business criticality of application details 205 is gathered using the business stakeholders from the user 101. Furthermore, the criteria values for the performance criterions may be collected and with the relevant rank for each criterion to be computed. It should be noted that rank for performance criterions whereby quantitative criteria may be derived by normalizing their values to make them comparable to other criteria values. In case of qualitative criteria, the pair wise comparison of performance criterions is practiced. It should be noted with high attention that pair wise comparison may mean examining relative importance of each option against each of the other option in pairs using a square matrix of options. Furthermore, as an example, let there may be "n" scenarios and "m" qualitative criterions thereby $(n*(n-1)/2)*m$ comparisons may be required.

By way of an example, for an application with 10 scenarios and 1 criterion, 45 comparison values from users may be taken. Alternatively, the MCDM 214 provides rating approach in this situation. Accordingly, a scale of intensities (viz low, medium, high) may be established for qualitative criteria like business criticality or resource intensiveness. Pair wise comparison of the scale of intensities may be applied to get the relative importance of one over another and accordingly the rank may be computed. Furthermore, the user 101 rates the qualitative performance criterions values for the application scenarios on the scale of intensities for the relevant criteria. It should be noted that the scale of intensities may be replaced with relevant priorities accordingly. In this situation, only $n*m+(i*(i-1)/2)*m$, wherein (i may be the number of the scale of intensities for m criteria) user data may be required. It should be noted that for the above example the number of user data needed for pair wise comparison may be 3, besides the ratings for each performance criterion.

The second ranking is explained as follows. The second ranking method may start with aggregating the rank of performance scenarios 118 for both benefit 210 and cost 208 criteria. It should be observed with care that the method thereby may be a cost benefit analysis technique. The method further continues with the ranking application scenarios for each benefit criteria 210 and may be represented in a matrix form. Accordingly, the matrix may be multiplied with a eigen vector of benefit criteria ranks and a vector of the total rank of scenarios based on the benefit criteria 210 is obtained. As a preliminary example, let there may be "n" scenario 104 ranked for "m" criteria, thereby a matrix of order (n*m) may be formed. Furthermore, the matrix may be multiplied with (m*1) criteria vector comprising of multiple ranks of the "m" criterions to obtain (n*1) vector rank of the scenario. Similarly, a vector of rank of scenario based on the cost criteria 208 may be derived. The method further continues to compute the overall criticality rank for scenarios to get the output 218 comprising of performance scenarios 118 by taking a ratio of both the benefit 210 and the cost 208 criteria. Furthermore, the performance scenarios 118 with higher value of ratio may be selected. It should be noted with high intention that for determining better performance criticality the scenarios with higher ratio values will have the high value of benefit criteria and the low value of cost criteria.

The MCDM 214 may be a method for formalizing decision making whereby there may be a limited number of choices, each having a multiple attributes. The MCDM 214 further may convert a task of identification of the representative performance scenarios into multi criteria decision making problem. Furthermore, the MCDM 214 computes the relative ranks of the application scenarios 104 for each cost 208 and benefit 210 criteria individually. Subsequently, the MCDM 214 aggregates the scenario ranks for benefit 210 and cost 208 and finally computes an overall criticality rank for scenarios by taking the ratio of the benefit 210 and cost 208 ranks. The rank list 216 is a descending ordered list of ranks computed. The output 218 gives a list of the selected performance scenarios 118. The performance scenarios 118 may be useful for verifying a software system in software performance modeling and analysis.

Figure 3:
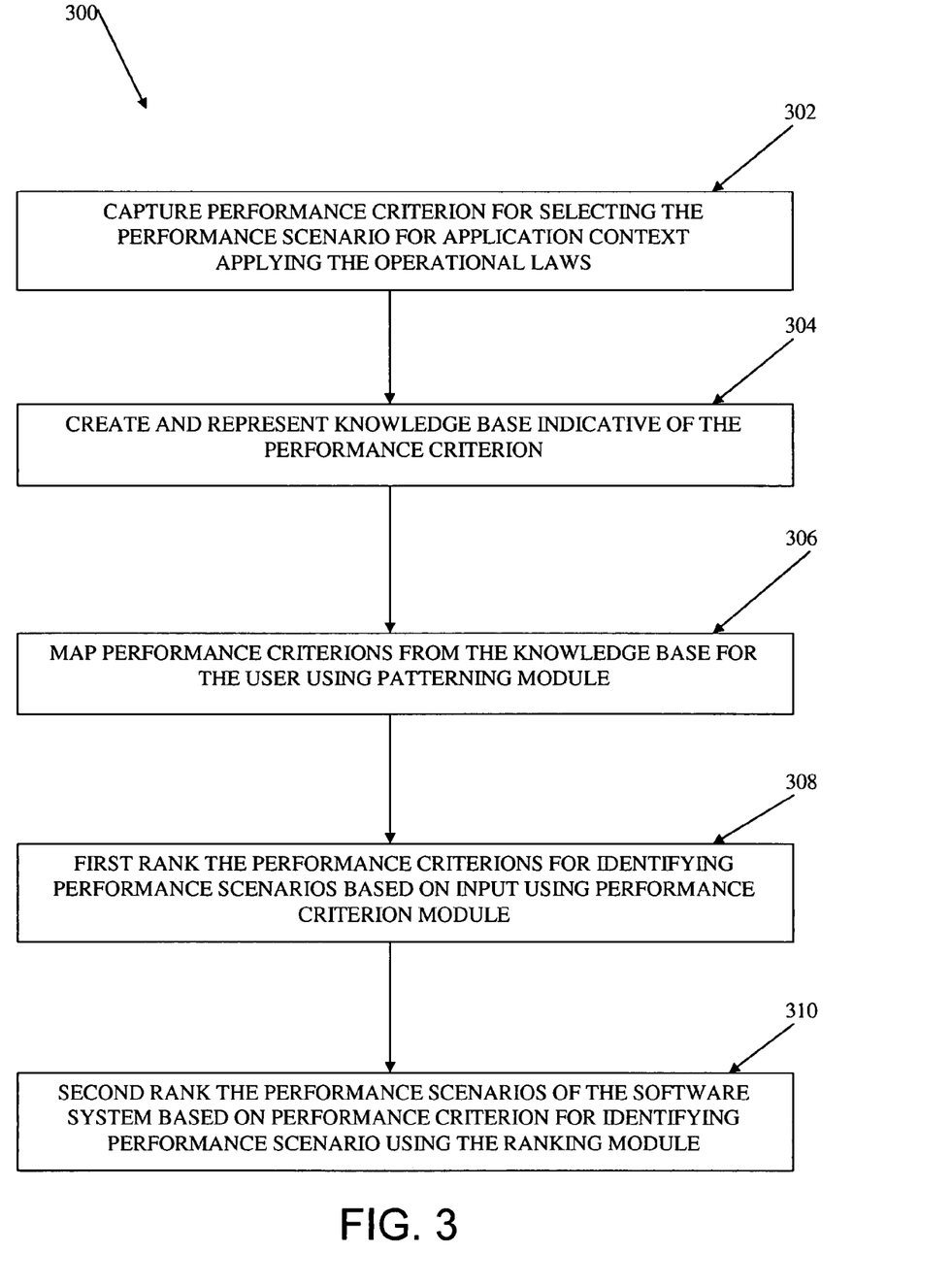
FIG. 3 is a flow diagram, illustrating a method involved in the process of identifying scenarios using a Multi Criteria Decision Making (MCDM) technique and a performance knowledge base, in accordance with an aspect of the present technique.

As illustrated in FIG. 3, depicts a flow diagram illustrating a method 300 involved in identifying the performance scenarios. As illustrated the method 300 starts in step 302, wherein the performance criterion may be captured to select the performance scenario for input applying the operational laws. The step 302 further states that using the operational laws a list of criteria is stored in the knowledge base and depending on the input of the scenarios the required or essential criteria is retrieved from the knowledge base. The method continues at step 304, wherein the knowledge base may be created and represented that may be indicative of the performance criterion. The knowledge base acts as a repository from which the applicable criterions are obtained based on the application context. It should be noted that user may add multiple criterions and also may state relative importance of the criterions. The method continues at step 306, wherein the performance criterions may be mapped from the knowledge base for the user application using patterning module. The step 306 explains further that the user submits the tasks to the GUI (application context) and the details may be the scenarios that together forms the input module The step 306 further automates classification of performance criterions into directly proportional (benefit) and inversely proportional (cost) categories for performance scenario selection using the operational laws.

The method continues at step 308, wherein the performance criterions may be first ranked for identifying performance scenarios based on input using performance criterion module. The step 308 further explains the calculation of the absolute weights of criterions based on the relative importance of these criterions. The method finally ends at step 310, wherein the performance scenarios of the software system may be second ranked based on performance criterion for identifying performance scenario using the ranking module. The step 308 further explains the computation of the relative ranks of the input for each qualitative and quantitative criterion individually. The step 308 further states that for each cost and benefit criteria scenario ranks are defined using the MCDM technique. The performance scenarios may be generated using the criteria and relevant ranks applying the MCDM technique. The knowledge base stores the criteria or ranks or application context details and uses these attributes as the historical data for future requirements. It should be noted that this step explains the aggregation of the scenario ranks for both benefit and cost criteria and finally computes the overall rank for scenarios by taking the ratio of the cost and benefit ranks. By way of an example, consider a case study of a shipment application, pursued for re-engineering. The existing application may have multiple performance problems and may expect to support substantial increase in the workload in accordance to a business requirement. Performance modeling exercise may be planned for the new application architecture. It should be noted that performance modeling may be a structured and repeatable approach for modeling the performance of a software system. Consequently, a minimum set of application scenario may be required. Therefore with the objective of determining critical and frequently used workloads, a workload modeling study is conducted. The case study continues helping to baseline a arrival time, a arrival pattern and a response time for 200 odd application workloads. Table 1 thereby may be a snap shot of the workload modeling results for a representative time frame. The table 1 also may have the projected workload for the target system in relevant to inputs from the business stakeholders. Furthermore, a mix of Online Transaction Processing (OLTP), batch, message and report printing workloads may be observed in the workload characterization resulting to the decision to take performance scenarios of each workload type for performance modeling. It should be noted that OLTP is a form of transaction processing conducted via computer network. Further, some applications of OLTP include electronic banking, order processing, employee time clock systems, e-commerce, and e-Trading. A batch is a group of similar items produced, processed or gathered together and treated as a single unit. Furthermore, during these situations, the application of the MCDM method for identifying OLTP performance scenario may be discussed.

TABLE 1

| Application Workload | Business Criticality | Response Time | Existing arrival rate (Request/Hr) | Projected arrival rate (Request/Hr) | Resource Intensiveness | Type of Workload |
|---|---|---|---|---|---|---|
| Scenario 1 | Medium | 5 | 75 | 82.5 | Medium | Online |
| Scenario 2 | Medium | 3 | 7000 | 7700 | Low | Online |
| Scenario 3 | Medium | 2 | 70 | 77 | Medium | Online |
| Scenario 4 | Medium | 2 | 7000 | 7700 | Medium | Online |
| Scenario 5 | Medium | 2 | 70 | 77 | Low | Online |
| Scenario 6 | Medium | 5 | 4 | 4.4 | Medium | Messageing |
| Scenario 7 | Medium | 5 | 30 | 33 | High | Online |
| Scenario 8 | Medium | 3 | 75 | 82.5 | Medium | Online |
| Scenario 9 | Medium | 3 | 22.5 | 24.75 | High | Online |
| Scenario 10 | High | 2 | 780 | 858 | Medium | Online |

Table 2 illustrates the output after selection of criterions, their eigen vector values and normalized ranks, determined from the pair wise comparison. Furthermore, the business criticality, throughput and resource intensiveness may be considered as benefit criterions and further response time may be considered as cost criterions.

TABLE 2

| Criteria | Eigen Vector | Normalized Rank |
|---|---|---|
| Business criticality | 0.45 | 4.30 |
| Response Time | 0.24 | 2.27 |
| Throughput | 0.20 | 1.87 |
| Resource Intensiveness | 0.10 | 1.00 |

Furthermore, with regard to first ranking of scenarios for the qualitative criterion (business criticality or resource intensiveness) may be determined using the ratings approach as explained earlier. Likewise a scale of low, medium, and high intensities may be established and pair wise comparison of the scales may be used to obtain corresponding eigen vector values and normalized ranks as illustrated in table 3. Furthermore, the normalized ranks for the quantitative criteria (response time, throughput) of the scenarios may be obtained.

TABLE 3

| Business criticality | Eigenvector values | Normalized values |
|---|---|---|
| Low | 0.15 | 1 |
| Medium | 0.35 | 2.32 |
| High | 0.49 | 3.23 |

Further, with regard to second ranking as explained earlier, weighted benefit and cost rank of each scenario may be calculated by matrix multiplication. Subsequently, the overall ranks of scenarios may be obtained by taking the ratio of the benefit and cost ranks. Table 4 illustrates relevant benefit and cost ranks in terms of percentage values thereby. Following the above analysis, it may be determined that scenario 4 may be the most representative performance scenario for the OLTP workload type.

TABLE 4

| Business Transaction | Weighted sum of benefits | Weighted costs | Benefit/Cost Ratio |
|---|---|---|---|
| Scenario 1 | 1.38 | 1.21 | 1.14 |
| Scenario 2 | 4.78 | 0.73 | 6.58 |
| Scenario 3 | 1.38 | 0.48 | 2.86 |
| Scenario 4 | 4.56 | 0.48 | 9.42 |
| Scenario 5 | 1.26 | 0.48 | 2.61 |
| Scenario 6 | 1.58 | 1.21 | 1.30 |
| Scenario 7 | 1.58 | 1.21 | 1.30 |
| Scenario 8 | 1.38 | 0.73 | 1.90 |
| Scenario 9 | 1.58 | 0.73 | 2.17 |
| Scenario 10 | 2.13 | 0.48 | 4.41 |

Relevantly, multiple similar scenarios may be selected having high values of the benefit cost ratio. Likewise, the performance scenarios from other one or more workloads (messaging, printing) be selected. The resultant list may be the selected performance scenarios as illustrated in Table 5 thereby.

TABLE 5

| Application Workload | Business Criticality | Maximum Acceptable Average Response Time(sec) | Projected Arrival Rate (Request/Hr) | Resource Intensiveness | Type of Workload |
|---|---|---|---|---|---|
| Scenario 4 | 2 | 2 | 7700 | 2 | OLTP |
| Scenario 6 | 2 | 5 | 4.4 | 2 | Mq series |
| Scenario 35 | 2 | 0.15 | 24000 | 3 | Printer |
| Scenario 31 | 3 | 2 | 15400 | 3 | Scanner |

The case study as explained above may choose performance scenarios based on one or more critical factors. Likewise, depending on the software developer's requirements, multiple criteria may be taken into account. The case study may address the complex problem of identifying performance scenarios on multiple criteria having variety of priorities. A scientific method exploiting the MCDM technique may be presented to facilitate and accelerate the performance scenario selection procedure.

As will be appreciated by those skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that may be, in parallel. Furthermore, the functions may be implemented in a variety of programming languages. Such code, as will be appreciated by those skilled in the art, may be stored to adapt for storage in one or more tangible machine readable media, such as on memory chips, local or remote hard disks, optical disks or other media, which may be accessed by a processor based system to execute the stored code. Note that the tangible media may comprise paper or another suitable medium upon which the instructions may be electronically captured via optical scanning of the paper to other medium, then compiled, interpreted or otherwise processed in a suitable manner if necessary, and then stored in a computer memory. The present technique automates performance scenario identification during software modeling and analysis stage, thereby reducing the dependency on subject matter experts or other knowledge sources. The technique further reduces the mean time to identify the performance criterions and scenarios and also reduces the subjectivity in the scenario identification process. Furthermore, the present technique reduces the chances of incorrect or incomplete performance analysis. It should be noted with high attention that the present technique may also be advantageous during the performance testing phase of any software system thereof.

While, the following description is presented to enable a person of ordinary skill in the art to make and use the invention and is provided in the context of the requirement for obtaining a patent. The present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest cope consistent with the principles and features described herein. Many modifications of the present invention will be apparent to those skilled in the arts to which the present invention applies. Further, it may be desirable to use some of the features of the present invention without the corresponding use of other features.

Accordingly, the foregoing description of the present invention should be considered as merely illustrative of the principles of the present invention and not in limitation thereof.

What we claim is:

1. A method of evaluating performance of at least one software system, the method comprising:
   using a computing device, identifying a plurality of performance criterion using a plurality of operational laws, wherein a plurality of operational laws comprise a Little Law equation and a utilization law, wherein a utilization law is device throughput multiplied by service demand, whereby service demand for the devices remain constant;
   gathering from the user a set of application details, which are associated with an application scenario;
   mapping the application details with a patterning module that uses a knowledge base to rank the criteria to reflect the requirements of the application scenarios based on context details of user input; and
   using a computing device, selecting a plurality of performance scenarios for the at least one software system based on at least one of the plurality of performance criterion using at least one Multiple Criteria Decision Making (MCDM) technique;
   wherein the MCDM technique comprises computing a plurality of ranks of the application scenarios for each of a cost criteria and a benefit criteria individually, aggregating the application scenario ranks for the benefit criteria and cost criteria, and computing an overall criticality rank for the application scenarios by taking the ratio of the benefit criteria and cost criteria ranks.

2. The method as recited in claim 1, further comprising capturing the plurality of performance criterion to select the plurality of performance scenarios for at least one input using the plurality of operational laws.

3. The method as recited in claim 1, further comprising mapping the plurality of performance criterion with the at least one input using a knowledge base.

4. The method as recited in claim 3, wherein creating and representing the knowledge base indicative of the plurality of performance criterion using the plurality of operational laws.

5. The method as recited in claim 1, further comprising first ranking a plurality of scenarios of each of a plurality of quantitative or qualitative performance criterion of the at least one software system to identify the plurality of performance scenarios using a ranking module.

6. The method as recited in claim 1, further comprising ranking to combine a plurality of performance scenario ranks for each of the plurality of performance criterion selected as at least one benefit or at least one cost criteria using at least one Multiple Criteria Decision Making (MCDM) technique.

7. The method as recited in claim 6, wherein ranking the plurality of performance scenario for the at least one input comprises using a cost benefit analysis.

8. The method as recited in claim 7, wherein the at least one MCDM technique is used to evaluate and analyze performance of the at least one software system of at least one scenario.

9. The method as recited in claim 6, wherein the at least one qualitative criteria comprises a plurality of scale of intensities selected as low, or medium or high value.

10. The method as recited in claim 9, wherein comparing the low or medium or high value from a multiple set of the plurality of scale of intensities for computing at least one rank.

11. The method as recited in claim 10, wherein the at least one rank of each of the plurality of scale of intensities is displayed using at least one historical data of the knowledge base.

12. The method as recited in claim 1, further comprising listing the plurality of performance criterion and storing into the knowledge base using the plurality of operational laws.

13. The method as recited in claim 1, further comprising retrieving the plurality of performance criterion depending on the at least one input of a plurality of users.

14. The method as recited in claim 1, further comprising classifying the plurality of performance criterion into at least one benefit criteria or at least one cost criteria or both using the plurality of operational laws.

15. The method as recited in claim 14, wherein the at least one benefit criteria comprise a plurality of high value criteria and the at least one cost criteria comprise a plurality of low value criteria.

16. The method as recited in claim 14, further comprising deriving at least one benefit rank of the at least one benefit criteria and at least one cost rank of the at least one cost criteria using the at least one MCDM technique.

17. The method as recited in claim 16, further comprising comparing the at least one benefit criteria and the at least one cost criteria with multiple set of the at least one cost criteria and the at least one benefit criteria using one of the at least one MCDM technique.

18. A system for evaluating performance of at least one software system, the system comprising:
a computer processor adapted to allow modules to function in a system;
an input module adapted to obtain a plurality of performance criterion depending on at least one input and storing into a knowledge base using a plurality of operational laws, wherein a plurality of operational laws comprise a Little Law equation and a utilization law, wherein a utilization law is device throughput multiplied by service demand, whereby service demand for the devices remain constant;
a gathering module adapted to gather from the user a set of application details, which are associated with an application scenario;
a patterning module that uses the knowledge base to rank the criteria to reflect the requirements of the application scenarios based on context details of user input;
a selection module adapted to select a plurality of performance scenarios for the at least one software system depending on at least one of the plurality of performance criterion using at least one Multiple Criteria Decision Making (MCDM) technique; and
an output module adapted to display the plurality of performance scenarios based on the at least one input and the plurality of performance criterion and at least one rank using the at least one MCDM technique,
wherein the MCDM technique comprises computing a plurality of ranks of the application scenarios for each of a cost criteria and a benefit criteria individually, aggregating the application scenario ranks for the benefit criteria and cost criteria, and computing an overall criticality rank for the application scenarios by taking the ratio of the benefit criteria and cost criteria ranks.

19. The system as recited in claim 18, further comprising mapping the plurality of performance criterion to the at least one input and listing the plurality of performance criterion with at least one rank.

20. The system as recited in claim 19, wherein the knowledge base adapted to store and retrieve the plurality of performance criterion with the at least one rank.

21. The system as recited in claim 18, further comprising at least one historical data of the knowledge base adapted to display the at least one rank as required by at least one user.

22. The system as recited in claim 18, further comprising a plurality of operational laws adapted to classify the plurality of performance criterion into at least one cost criteria and at least one benefit criteria.

23. The system as recited in claim 18, further comprising the at least one MCDM technique adapted to relatively first rank each of the plurality of performance criterion.

24. The system as recited in claim 18, further comprising the at least one MCDM technique adapted to relatively rank each of a plurality of scenarios, wherein the at least one MCDM technique calculates a ratio by dividing at least one benefit rank with at least one cost rank.

25. A computer program product tangibly embodying a plurality of instructions, which when executed by a computer processor cause said processor to carry out steps for evaluating performance of at least one software system, the computer program product comprising:
program code adapted to select a plurality of performance criterion using a plurality of operational laws, wherein a plurality of operational laws comprise a Little Law equation and a utilization law, wherein a utilization law is device throughput multiplied by service demand, whereby service demand for the devices remain constant;

program code adapted to gather from the user a set of application details, which are associated with an application scenario program code adapted to create and represent a knowledge base indicative of the plurality of performance criterion using the plurality of operational laws;

program code adapted to map the plurality of performance criterion to the knowledge base to reflect the requirements of the application scenario based on context details of user input; and program code adapted to rank a plurality of scenarios of the at least one software system depending on the mapping of the plurality of performance criterion using the at least one Multiple Criteria Decision Making (MCDM) technique wherein the MCDM technique comprises computing a plurality of ranks of the application scenarios for each of a cost criteria and a benefit criteria individually, aggregating the application scenario ranks for the benefit criteria and cost criteria, and computing an overall criticality rank for the application scenarios by taking the ratio of the benefit criteria and cost criteria ranks.

26. The computer program product as recited in claim 25, further comprising program code adapted to classify the plurality of performance criterion as at least one benefit criteria and at least one cost criteria using the plurality of operational laws.

27. The computer program product as recited in claim 25, further comprising program code adapted to providing at least one rank of the plurality of performance criterion using the at least one MCDM technique.

28. The computer program product as recited in claim 26, further comprising program code adapted to display at least one performance critical rank of the plurality of scenarios in descending order.

* * * * *